US006387281B2

(12) United States Patent
Millard et al.

(10) Patent No.: US 6,387,281 B2
(45) Date of Patent: May 14, 2002

(54) PROCESSES AND APPARATUS FOR TREATING SEWAGE OR LIKE SLUDGE

(75) Inventors: Robin Millard, Prestbury (GB); Frederick H. Kurtz, Morristown, NJ (US)

(73) Assignee: R3 Management Limited (GB)

( * ) Notice: Subject to any disclaimer, the term of this patent is extended or adjusted under 35 U.S.C. 154(b) by 0 days.

(21) Appl. No.: 09/815,766

(22) Filed: Mar. 23, 2001

Related U.S. Application Data
(60) Provisional application No. 60/196,442, filed on Apr. 11, 2000, and provisional application No. 60/265,002, filed on Jan. 30, 2001.

(30) Foreign Application Priority Data

Mar. 25, 2000 (GB) .............................................. 0007248
Jan. 11, 2001 (GB) .............................................. 0100683

(51) Int. Cl.⁷ ................................ C02F 1/02; C02F 1/50
(52) U.S. Cl. ...................... 210/764; 210/766; 210/768; 210/770; 210/790; 210/198.1; 210/252; 210/259
(58) Field of Search ............................... 210/764, 766, 210/767, 768, 770, 790, 198.1, 205, 252, 259

(56) References Cited

U.S. PATENT DOCUMENTS

| 4,079,003 A | 3/1978 | Manchak | 210/46 |
|---|---|---|---|
| 4,306,978 A | 12/1981 | Wurtz | 210/750 |
| 4,341,562 A | 7/1982 | Ahlbeck | 106/97 |
| 4,432,800 A | 2/1984 | Kneller et al. | 106/85 |
| 4,554,002 A | 11/1985 | Nicholson | 71/12 |
| 4,781,842 A | 11/1988 | Nicholson | 210/751 |
| 4,872,998 A | 10/1989 | Dausman et al. | 210/710 |
| 4,902,432 A | 2/1990 | Kuno | 210/764 |
| 5,135,664 A | 8/1992 | Burnham | 210/751 |
| 5,275,733 A | 1/1994 | Burnham | 210/609 |
| 5,279,637 A | 1/1994 | Lynam et al. | 71/12 |
| 5,385,673 A | 1/1995 | Fergen | 210/710 |
| 5,417,861 A | 5/1995 | Burnham | 210/609 |
| 5,435,923 A | 7/1995 | Girovich | 210/770 |
| 5,547,486 A | 8/1996 | Detrick et al. | 71/28 |
| 5,557,873 A | 9/1996 | Lynam et al. | 34/379 |
| 5,679,262 A | 10/1997 | Girovich et al. | 210/751 |
| 5,853,450 A | 12/1998 | Burnham et al. | 71/9 |
| 5,853,590 A | 12/1998 | Burham | 210/609 |
| 6,079,122 A | 6/2000 | Rajkovich | 34/574 |

FOREIGN PATENT DOCUMENTS

| EP | 0 283 153 B1 | 10/1992 | C05F/7/00 |
|---|---|---|---|
| GB | 2 276 876 A | 10/1994 | C02F/11/14 |
| WO | WO 98/29348 | 7/1998 | C02F/11/14 |
| WO | WO 99/57081 | 11/1999 | C05F/11/08 |

Primary Examiner—Betsey Morrison Hoey
(74) Attorney, Agent, or Firm—Bracewell & Patterson, LLP

(57) ABSTRACT

There is disclosed a process for treating sewage or similar organic sludge to produce a pasteurized and dried product comprising the steps of:

dividing the sludge into at least one first portion and at least one second portion;

drying the first portion so that the first portion has a higher dry solids content than that of the second portion;

mixing the fist portion and the second portion to produce a mixture having a dry solids content which is intermediate between that of the first and second portions;

adding an alkaline admixture to the mixture in order to pasteurize the mixture and thereby produce the product without employing subsequent drying by aeration.

27 Claims, 2 Drawing Sheets

PROCESSES AND APPARATUS FOR TREATING SEWAGE OR LIKE SLUDGE

CROSS REFERENCE TO RELATED APPLICATION

This application claims priority based upon U.S. Provisional Application Ser. No. 60/196,442, filed Apr. 11, 2000; U.S. Provisional Application Ser. No. 60/265,002, filed Jan. 30, 2001; Great Britain Application No. GB 0007248.8, filed Mar. 25, 2000; and Great Britain Application No. GB 0100683.2, filed Jan. 11, 2001.

BACKGROUND OF THE INVENTION

1. Field of the Invention

This invention relates to processes and apparatus for treating sewage sludge or similar organic sludge, such as that obtained from industrial sites such as waste water treatment plants.

2. Description of the Prior Art

EP 0 283 153 B1 discloses a method of treating wastewater sludge to provide a fertiliser for agricultural lands which can be applied directly to the land. The method involves mixing the sludge with alkaline material of specified fineness to raise the pH of the mixture to at least 12 for at least a day and to effect pasteurisation, and then drying the mixture. Drying is done either a) by aeration and maintaining the pH above 12 for at least seven days until the solids levels reach and maintain a minimum of 65% bulk solids, or b) by aeration and heating to a temperature of at least 50° C. and so that the solids levels reach and maintain a minimum of 50% solids. In b) the temperature should not be so high as to destroy all non-pathogenic organisms. The elevation of the pH and the drying are effected so as to reduce odour and undesirable viruses, bacteria, parasites and vector (e.g. flies) attraction to the sludge and prevent significant pathogen regrowth while not eliminating beneficial non-pathogenic microorganisms. At least some of the temperature rise is due to the exothermic reaction with the alkali. The product is allowed to air cure for about 10 days after achieving the desired solids content. Drying and curing may be effected by windrowing, turn-over or other forced air methods, and curing or aeration time is dependent on the aeration procedure and other factors, such as ambient temperature and humidity, and clearly need to be determined, for any particular circumstances, experimentally to see that the required end point has been reached. This involves taking samples to measure the solids content, testing for:

animal viruses—less than one plaque forming unit per 100 ml salmonella bacteria—less than three colony forming units per 100 ml parasites—less than one viable egg per 100 ml significant regrowth of the pathogenic microorganisms—there should be none and assessing the reduction of odour to a level tolerable in a closed room and that this reduction is maintained indefinitely under any climatic conditions, and whether flies are less attracted to the product. At the same time, the presence of at least some beneficial non-pathogenic microorganisms must be established.

If method b) is used, the minimum recommended time for maintaining the temperature at least 50° C. (but not so high as to destroy all non-pathogenic microorganisms) is at least 12 hours and the heat treated alkaline stabilized dewatered sludge cake is then air dried (while the pH remains above 12 for at least 3 days) through intermittent turning of windrows until a minimum of 50% solids content is achieved.

GB 2 276 876 A, which refers to EP 0 283 153, describes treatment of sewage sludge having a solids content of at least 15% by weight with an alkaline material containing free lime, and storing and or drying and/or composting the resultant mixture, adding sufficient lime to the mixture to achieve a pH of at least 10. Higher pH values, even higher than 12, are not ruled out, but it is suggested that excellent reduction in pathogens can be achieved at pH levels below 12 with reduced evolution of ammonia, which renders the treated sludge and its surroundings less unpleasant and means that the treated material retains more nitrogen increasing its value as a fertiliser.

The method of GB 2 276 876 involves dewatering the sludge, e.g. in a belt press, and measuring it using a weigh hopper into a mixer into which is delivered alkaline material in the appropriate amount, the mixed material being delivered to a skip to deliver it to a windrowing area where it is turned periodically, normally for a period up to seven days. However, it is suggested also tat provided the amount of calcium oxide that has been introduced is sufficient to raise the pH to a value greater than 12, and sufficient, indeed, to ensure that it stays above 12 for at least 2 hours, then it is possible to store the mix for not less than two hours, but then apply it directly to the land.

It is apparent that the methods described in these two specifications are labour intensive and to a large extent dependent upon a subjective judgement (the assessment of odour in a closed room, for example) or upon results of biological tests which themselves could take days or weeks before you have a result.

It is necessary, for effective treatment, to mix the alkali with dewatered sludge, but sludge, nonetheless that comprises a substantial quantity of water, as it is only in the presence of water that the desired exothermic chemical reaction takes place. The end product—as is clear from the specification discussed—is required to have less water content than is appropriate during the heat-development stage. It is an essential part of the process, then, that the product be eventually dried, and this is the reason for treating it by windrowing. Windrowing, especially aeration by turning over windrows, is not only labour intensive and floor space intensive, but is a slow method of drying, and exposes personnel to excessive levels of ammonia and volatile organic compounds.

There are further problems and disadvantages with prior art methods such as those disclosed in EP 0 283 153 and GB 2 276 876. For example, a relatively large quantity of alkaline material is required: so much so that the alkaline material constitutes a significant proportion of the end product produced by the treatment. This adds to costs in three significant ways. Firstly, there are costs associated with providing large quantities of alkaline material. Secondly, there are considerable costs associated with materials, handling of increased mixed product volume through the heat pulse and windrow formation and turning. Thirdly, there are transportation costs associated with the removal of the end product from the site. A further consequence is that, because a significant proportion of the end product is alkaline material, the relative proportions of nutrients such as nitrogen and phosphorus in the end product are not only reduced but also are fixed due to the high pH of the product. This reduces the possible value of the end product as an agricultural fertiliser. Furthermore, since such large quantities of alkaline materials are added, a pH greater than 12 is maintained for extended periods and may result in the product being classified as a special waste by regulatory bodies. Special waste requires special land fill disposal.

It is difficult, if not impossible, to evenly control, culture and measure the temperature of a windrowed product. Furthermore, it has been found that, in practise, considerable problems with product odour, in particular ammonia, can be encountered when the method of EP 0 283 153 is employed, both during production and in the finished product.

It should be noted that, under United States of America regulations for the treatment of sewage sludge (EPA Rule 503 Regulations), it is necessary not only to effect pasteuisation (Class A pathogen reduction) but also to effect stabilisation of the product. The latter is termed the Vector Attraction Reduction Requiremnent, and is described at Rule 503.33(b). For the avoidance of doubt, the terms "stabilisers" and "stabilisation" as used herein refer to a process which satisfies the Vector Reduction Requirement as set forth in US EPA Rule 503.33(b).

SUMMARY OF THE INVENTION

The present invention overcomes the aforesaid problems and disadvantages and provides a new paradigm in the treatment of sewage sludge. The present invention provides processes and apparatus for treating sewage sludge which are more efficient, economic, less labour and space intensive, and more controllable, (so as not to depend upon the results of bio-technological testing, inaccurate manual sampling, and measurement procedures such as dry solids content, temperature and pH) than prior art processes to date, and which provide continuous on line process monitoring and management. This ensures that the critical process steps which ensure pathogen destruction and subsequent long term stability of the treated sludge are achieved. In particular, the tonnage of end product produced after the treatment of a given amount of sludge is significantly reduced, resulting in lower production, handling and transportation costs. This is principally because the amount of sludge and alkaline material required in order to effect pasteurisation is significantly reduced. A further advantage associated with reduced usage of alkaline material is further cost sayings. Furthermore, in contrast to the methods of EP 0 283 153 and GB 2 276 876, the present invention does not involve the use of aeration methods such as windrowing. Further still, the floor space (or "footprint") required by the apparatus of the present invention is significantly reduced. Yet further, odours produced by the present invention are minimised and easily dealt with. Yet further still, the end product produced by the process of the present invention is of superior quality being high in available nutrients and substantially odour free. Furthermore, since significantly less alkaline material may be utilised both process temperature control and post process pH reduction are achieved more effectively.

According to a first aspect of the present invention there is provided a process for treating sewage or similar organic sludge to produce a pasteurised and dried product comprising the steps of:

dividing the sludge into at least one first portion and at least one second portion;

drying the first portion so that the first portion has a higher dry solids content than that of the second portion;

mixing the first portion and the second portion to produce a mixture having a dry solids content which is intermediate between that of the first and second portions;

adding an alkaline admixture to the mixture in order to pasteurise the mixture and thereby produce the product without employing subsequent drying by aeration.

There are numerous advantages which accrue from the splitting of the sludge into "dry" and "wet" streams. At least some destruction of harmful pathogens is achieved during the drying of the first portion of sludge, which has the consequence that a relatively small total amount of alkaline admixture is required to pasteurise (and stabilise) the mixture, which provides cost advantages and reduces the tonnage of product associated with a given amount of wet sludge starting material. Furthermore, drying of the first portion has the advantage that end products having excellent higher dry solids contents can be readily produced economically. It is well known that the higher the product dry solids content, the better the long term stability of the end product. The heat associated with the alkaline pasteurisation step can effect additional beneficial drying of the mixture (by way of exothermic heat from the exothermic reaction with the alkaline admixture). Further time and space intensive and costly drying steps, such as windrowing or other aeration techniques are not required. The method can be used to treat raw sludge feedstock, which has the advantage that an expensive sludge digester stage is not required. However, the method can also be used to treat digested sludge feedstock.

It should be noted the process can be operated in a batchwise, near continuous, or continuous fashion. Thus, the first and second portions might comprise one or more discrete packets of sludge, or they might comprise separate "streams" of sludge.

The alkaline admixture may be added to the mixture in order to stabilise the mixture. This can be achieved by ensuring that the pH of the mixture is raised to 12 or higher for two hours or more, and then at a pH of 11.5 or higher for an additional 22 hours.

The method may further comprise the step of dewatering the sludge to produce dewatered sludge cake prior to dividing the sludge into at least one first portion and at least one second portion.

The step of drying the first portion may effect substantial or complete pasteurisation of the first portion. In this way, the amount of alkaline admixture required is kept to a minimum. Additionally, it should be noted that since the drying of the first portion is not accomplished at high pHs, the odours associated with this drying step do not include ammonia. Rather, volatile species or gases such as volatile organic compounds, hydrogen sulphide and various mercaptans are produced, which can be easily removed by a biological filter, a scrubber or a regenerative thermal oxidiser. The effect of this is to significantly reduce the odour associated with sludge treatment (ammonia and certain volatile organic compounds being the prime sources of concern regarding such odours).

The first portion may be dried to a dry solids content of greater than 55%.

The first portion may be dried to a dry solids content of less than 90%.

The dry solids context of the mixture may be 50% or greater, preferably in the range 52 to 65%.

The dry solids content of the product may be greater than 60%, preferably greater than 65%.

The product may be continuously discharged. The pasteurisation and drying of the mixture may be performed in a FIFO (first in first out) hopper with or without recycling of the mixture.

In an important embodiment, the drying of the first portion is performed utilising heat generated by an electrical generator or waste heat derived from a suitable source. In this way, the process is made more energy efficient since the heat obtained as a by product from the generator or other waste heat source, and which would otherwise serve no useful purpose, is used for the drying step. In a particularly preferred (but non-limiting) embodiment, the electrical generator utilises methane gas evolved from a landfill or digester site. It is quite common that such sites exist in the proximity of municipal sewage treatment sites. It is advantageous that the methane evolved from such sites performs two useful tasks, namely the production of electricity and the production of usefull heat. It is possible that sewage treatment works utilising this aspect of the invention will be nett contributors of electrical power. Furthermore, it is advantageous that methane is removed from the atmosphere near to the digester or landfill site.

Green waste, such as grass clippings and leaves, may be added to the first and/or second portions, preferably the first portion.

In another important embodiment, the alkaline admixture is added to the mixture at a mixing ratio less than or equal to 30% by weight of sludge dry solids, preferably less than 25%, most preferably less than 20%. his represents a very low proportion of the eventually formed product, but is, surprisingly, sufficient to pasteurise and stabilise the sludge and produce a high quality product. Despite the low quantities of alkaline admixture used, excellent, controlled temperature pasteurisation and stabilisation profiles over an extended period of time can be obtained.

Preferably the alkaline admixture comprises lime which, advantageously, may be pulverised or otherwise finely granularised. It has been found that the greater surface area associated with lime treated in this manner improves the pasteurisation and stabilisation process.

The drying of the sludge may be effected by a thin film dryer, which may be a horizontal, single pass, indirectly heated thin film dryer. Such dryers are manufactured by Buss-SMS Gmbil of Prattein, Switzerland. These dryers operate on a plug flow basis, i.e., first in first out (FIFO), which has the advantage that the residence time of sludge in the dryer can be accurately established.

The method may be performed continutously.

According to a second aspect of the invention there is provided a facility for treating sewage sludge or similar organic sludge according to the first aspect of the invention; comprising:

means for dividing the sludge into at least one first portion and at least one second portion;

means for drying the first portion so that the first portion has a higher dry solids content than that of the second portion;

means for mixing the first portion and the second portion to produce a mixture having a dry solids content which is intermediate between that of the first and second portions;

means for adding an alkaline admixture to the mixture;

means for retaining the mixture and the added alkaline admixture in order to pasteurise the mixture, optionally to commence stabilisation, and thereby produce the product without employing subsequent drying by aeration.

The means for retaining the mixture and the added alkaline admixture may comprise a first in first out (FIFO) hopper.

The facility may further comprise means for dewatering the sludge prior to the division of the sludge into at least one first portion at least one and second portion, which means may comprise a belt press arrangement, which might be a multi-stage belt press.

The means for drying the first portion may comprise an electrical generator and means for transferring heat generated by the electrical generator to the first portion.

The means for drying the first portion may comprise a thin film dryer, which may comprise a horizontal, single pass, indirectly heated thin film dryer.

The facility may further comprise at least one store containing lime, the lime being used as the alkaline admixture or as part of the admixture. The lime may be pulverised or otherwise finely granularised.

According to a third aspect of the invention there is provided a dried sludge product produced by the process of the first aspect of the invention. Such product can have a high dry solids content (60% or greater), and is high in nutrients. The product can be used as a manufactured top soil product, and as agricultural fertiliser.

BRIEF DESCRIPTION OF THE DRAWINGS

Embodiments of processes and facilities in accordance with the invention will now be described with reference to the accompanying drawings, in which.

DETAILED DESCRIPTION OF INVENTION

Figure 1:
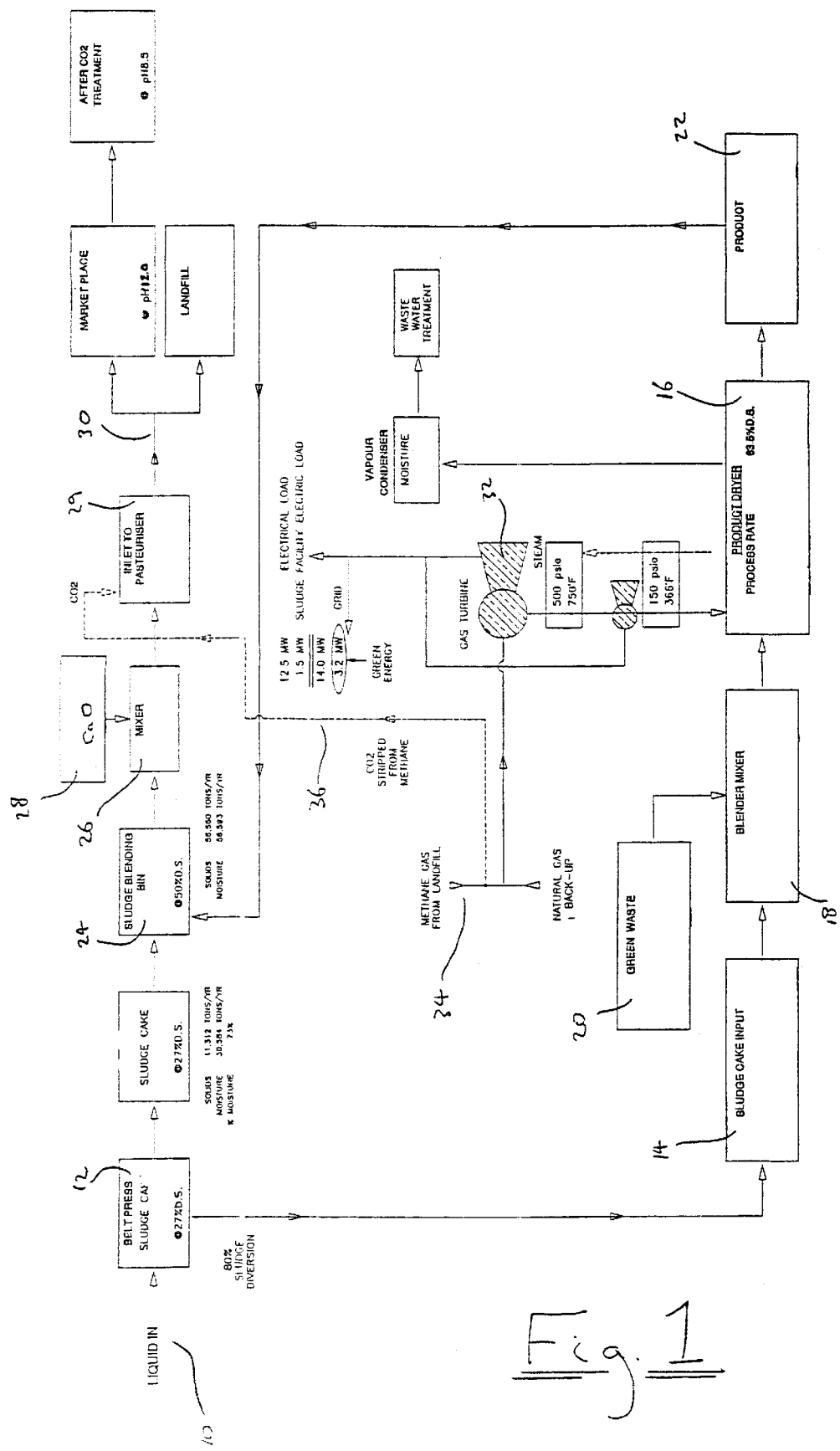
FIG. 1 is a schematic flow diagram of a process according to the invention.

FIG. 1 depicts an embodiment of the process of the present invention. Liquid sewage is introduced to the process at 10, the sewage being dewatered using a belt press system 12 to produce a sludge cake. Typically, the dry solids content of the sludge cake is ca. 27%. After dewatering, the sludge cake is separated/divided into first and second portions. It should be noted that in a batchwise process this division will produce discrete portions. However, as described more filly below, continuous or near continuous processing is also possible, in which instance the two portions will constitute different "streams" of sludge cake.

The first portion is transported by a transportation system 14 to a dryer 16. The transportation system can comprise known means such as belt conveyors and discharge ploughs, as well as infra-red moisture sensors and weigh belt systems providing continuous monitoring. Optionally, the first portion can enter a blender 18 where green waste 20 such as grass clippings can be introduced.

The dryer 16 dries the first portion at a suitable dewatered temperature for a length of time sufficient to produce dried sludge 22 of a desired dry solids content.

It is advantageous to dispose of green waste in this way for a number of reasons. Green waste has a very high water content, typically about 80%, and it therefore very bulky. In the USA, and in other countries, green waste cannot be disposed of in a landfill, but, rather, municipalities provide a collection service for so-called "yard waste". In addition to the cost of collection, the cost of disposal is high, since inter alia composting facilities are required. Such facilities are expensive to operate and run a risk of being the subject of complaints concerning odour. The present invention provides a more convenient way of disposing of and recycling green waste. Furthermore, since the dry portion of the green waste (ca. 20% of the original weight) is high in organic matter and nutrients such as N and P, it provides benefits to the end product.

The dried sludge 22 is transported by means such as conveyor belts to a sludge blending bin 24 where the sludge of the first portion is blended with the sludge of the second portion which, although dewatered, has not undergone further drying. This blending produces a mixture having a dry solids content which is intermediate between that of the first and second portions. The mixture is transported to a mixer 26, such as a continuous plough share mixer, where alkaline admixture from a silo 28 is added and mixed therewith. The mixture is transported to a pasteuriser 29, which can be a first in first out hopper.

Preferably, the alkaline admixture is CaO, although the invention is not limited in this regard.

It is highly advantageous that, owing to the drying of the first portion, the mixture of the first and second portions is already relatively dry. It is also highly advantageous that the drying of the first portion partially or totally pasteurises said portion. The upshot is that a relatively small amount of CaO is required in order to effect pasteurisation, and that the addition of CaO is sufficient to complete the drying process. Thus, further drying processes (such as windrowing), with all their attendant drawbacks, are unnecessary. Typically, the amount of CaO required is ca. 30% by dry weight of the sludge mixture or less, preferably less than 20%. A further benefit is that the pasteurisation/drying process is relatively short, being less than a day, preferably less than 5 hours, and can be less than four hours typically about a couple of hours. During the pasteurisation/drying process, appH of 12 or greater and a temperature up to ca. 70° C., are obtained. It is believed that adequate pasteurisation can be achieved at pHs lower than 12, and/or at temperatures lower than ca. 70%. Therefore the invention is not limited in these respects. A further benefit still is that the relatively small amount of CaO in the end product, and the dryness of the end product, results in a reduction in the amount of end product produced for a given input of sludge. A yet further benefit is rapid cooling of the product. A yet further benefit still is that, since an excess of CaO is not used, the pH of the product declines rapidly over time as CaO is consumed.

Typically, the temperature of the mixture after addition of alkaline admixture rises to, and is maintained homogeneously, at a minimum of 65° C. for up to 5 hours within insulated reactor vessels, during which time the pH is maintained at pH 12.0 or greater. During a subsequent 24 hour period the pH of the product is greater than 11.5. In this way, the requirements of EPA Rule 503.33(b)(6) may be met and stabilisation of the product can be achieved. It should be noted that typically the stabilisation process is not carried out entirely in the pasteuriser. Rather, the stabilisation process continues once the product has been discharged from the pasteuriser.

At the end of the process, the nutrient rich end product 30 is discharged using a belt conveyor arrangement.

The precise details of the dryness of the first and second portions, the mixing ratio of the first and second portions, the amount of alkaline admixture added and the dry solids content of the end product can be varied using the paradigm disclosed herein according to the precise application envisaged. By way of a representative example, a dewatered sludge cake of 27% dry solids content can be split into first and second portions in the ratio 4:1 by weight. The drying of the first portion is performed to produce a dry solids content of 63.5%. When mixed with the second portion, a mixture having a dry content of 50% is produced. Treatment with 30% by dry weight (15% by total weight) of CaO produces an end product of excellent dry solids content—67% or greater. In comparison with the method of EP 0 283 153, the tonnage of end product produced is reduced by over half.

These values should be considered as being representative only. However, in practise it is not desirable for the first portion to be dried to a dry solid content of around 50%, because sludge of this dryness is extremely sticky, rendering handling of the sludge a difficult task. Furthermore, it is not desirable for the first portion to be very dry, because very dry raw sludge is usually very fibrous, with little density, again rendering it difficult to use. Dry solid contents of ca. 90% or greater are probably too dry for convenient use, and in any case can introduce hazards such as spontaneous combustion and a risk of explosion.

Figure 2:
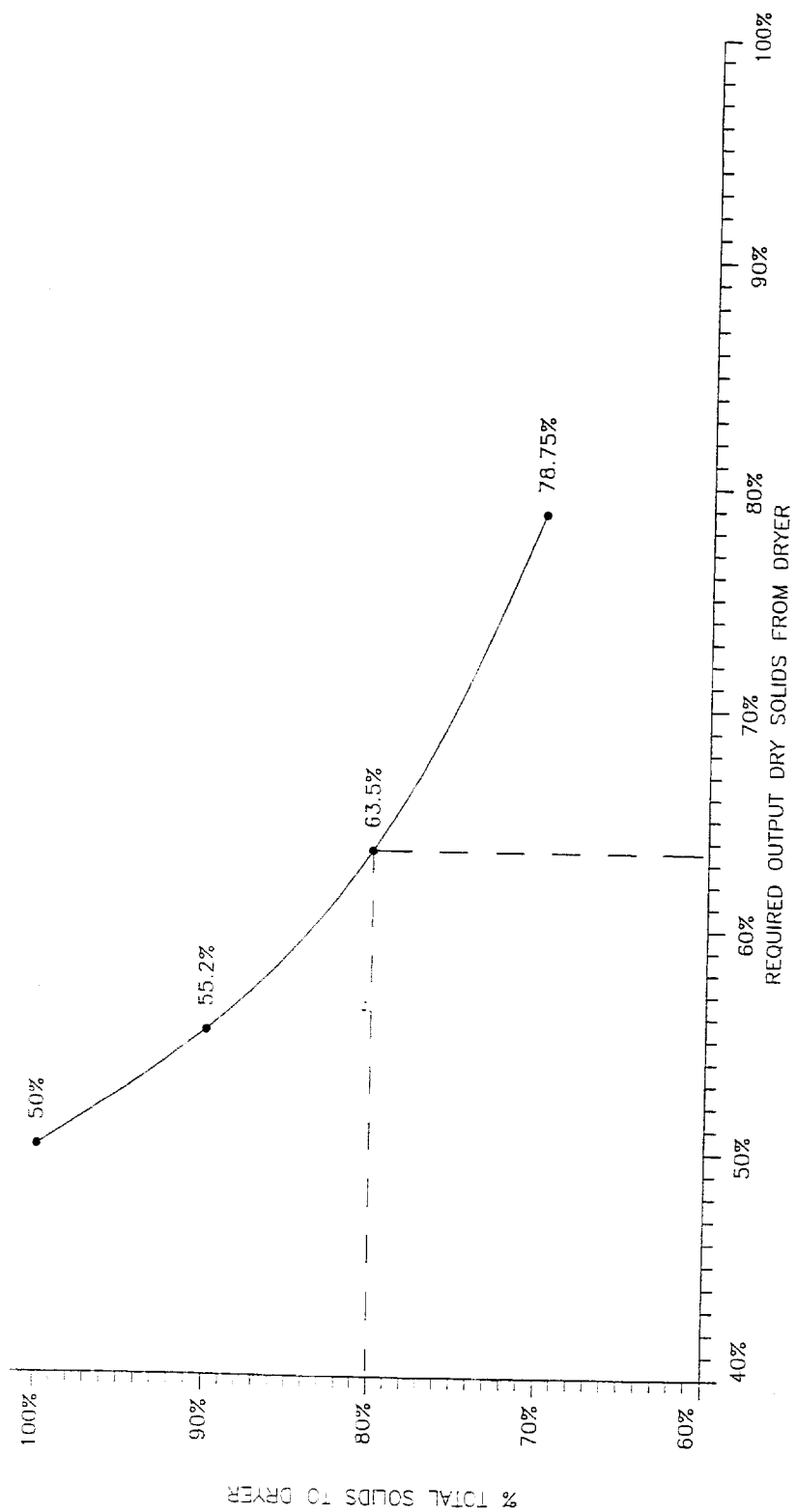
FIG. 2 is a graph of the percentage of sludge divided into the first portion against required dry solids content of the first portion in the instance that a 50% dry sludge mixture or greater is required prior to addition of the alkaline admixture.

Assuming that dewatered sludge cake of 27% dry solids content is utilised, and that a dry solids content of 50% in the mixture (before pasteurisation) is desired, it is possible to calculate the relationship between the percentage by weight of the dewatered sludge cake which is divided into the first portion (and subsequently dried), and the required dry solids content of this first portion after drying. This relationship is shown in graphical form in FIG. 2. The skilled person would appreciate how to adapt further the representative values discussed above, within the framework of the present invention.

In an important embodiment, electrical power is generated on-site using a gas turbine 32 powered by methane gas 34 which evolves from a nearby landfill or digester site. Landfill sites are quite commonly found in the vicinity of sewage and waste water treatment facilities. A by-product of the generation process is heat, which is advantageously used to dry the sludge of the first portion. The electricity generated by the gas turbine 32 can be used to power the sewage treatment facility, and can actually provide a surplus which can be inputted into the national/regional grid. It is also possible to use natural gas from any other suitable supply source for the purposes of generating electricity and heat.

The invention has been found to work particularly well when the CaO is pulverised or otherwise finely granularised. It is believed that this is due to the greater surface area available to participate in the reactions associated with the pasteurisation process.

Additionally, the invention has been found to work particularly well when horizontal, single pass thin layer film dryers which operate on a plug flow basis, i.e., FIFO, are used to dry the first portion. Such dryers are manufactured by, for example, Buss-SMS GmbH of Hohenrainstrasse 10, Prattlen 1, Switzerland. Buss-SMS dryer type D-0100 has been found to be very suitable for continuous drying of sludge to dryness at least in the range 50 to 65% dry solids content. Furthermore, the first portion can be mixed with the second portion whilst the first portion is significantly hot, (ca. 60° C.), so that the mixture is relatively hot thus making it relatively easy to attain pasteurisation temperature. A horizontal thin film dryer such as the BussSMS D-0100 can be incorporated into the system, by providing a feed pump with variable speed drive, conical feed hopper and agitator, a condenser and condensate receiver, a liquid ring pump (for drawing off incondensible vapours) and heating means. Blades in the dryer push the sludge through the dryer (in a generally horizontal direction in the case of a horizontal thin film dryer), whilst further blades ensure that the sludge is repeatedly spread thinly on to the dryer wall. The walls are indirectly heated by heating means, which can comprise, for example, a thermal oil heater or a steam boiler. It is quite possible, however, that other forms of drying can be usefully employed in the place of thin film dryers.

An advantage with t film dryers is that typically, the sludge is homogeneously dried at a minimum sludge temperature of 100° C. for a minimum residence time of ca 4 minutes. Such conditions are more than sufficient to effect complete pasteurisation of the sludge. It is possible to install ceramic surfaces into the dryer in order to monitor the drying temperature.

In a number of mixing trials, combinations of mixture dryness and CaO mixing ratios were employed. Sludge drynesses of ca. 46% dry solids content in the mixture were employed. This was produced by mixing a first sludge portion of ca 55% dry solids content with a second portion of ca. 26% dry solids content with the appropriate mixing ratio. CaO was added in % ratios of 13 to 26%. It should be noted that the dryness of the final product was not greatly in excess of the dryness of the mixture. For example, mixture at 46% dry solids content treated with 13.1% CaO resulted in a product of 52% dry solids content, whilst sludge at 46% dry solids content with 26.1% CaO added resulted in a product of 57% dry solids content.

It is highly advantageous that, owing to the drying of the sludge, the mixture of the sludge and alkaline admixture is already very dry, since further drying processes (such as windrowing), with all their attendant drawbacks, are unnecessary it is believed that it is significant that when the alkaline admixture is added to the mixture, the mixture is still significantly hot, because the first portion is hot at the time of mixing (ca. 40° to 60° or even greater) following the drying process. It is believed that the drying process imparts much of the heat required in the pasteurisation step, and that this enables pasteurisation to take place using a relatively minuscule amount of alkaline admixture. In contrast, it is likely that the relatively large amounts of alkaline admixture associated with the prior art methods of EP 0283153 and GB 2276876 are in part necessitated by the need to generate a pasteurising heat pulse from ambient temperature. This is achieved, in these prior art techniques, by the exothermic reaction of the alkaline admixture with water thereby requiring additional quantities of expensive alkaline admixture. It is also advantageous that the drying of the sludge can itself partially or totally pasteurise the sludge portion. The upshot of this is that a relatively small amount of CaO is required in order to effect overall pasteurisation and stabilisation. The addition of CaO can result in further drying due to the exothermic reaction with water but it should be noted it may not be necessary to effect further drying.

The entire process can be run continuously or near continuously. It is possible to utilise an individual or a plurality of belt press devices in order to ensure a constant or near constant flow of dewatered sludge cake. Similarly, a plurality of dryers and mixers can be used to ensure a continuous throughput. The pasteurisation step and stabilisation can be performed continuously using either a single or a plurality of first in first out hoppers or like devices. Because the pasteurisation and stabilisation step is relatively short, pasteurisation and stabilisation can be accomplished during a single pass through the hopper: in other words, recycling of material through the hopper is not necessary.

Ammonia evolved during the pasteurisation and stabilisation step can be removed using ammonia scrubbers. However, the amount of ammonia evolved is reduced, since partial or complete pasteurisation of the first portion is achievable during drying of the first portion. It is advantageous that, because this "prepasteurisation" of the first portion does not take place at high p ammonia is not evolved in any substantial quantity during this process. Rather, odorous compounds such as volatile organic compounds, hydrogen sulphide and numerous mercaptans are produced, which are easily dealt with using biological filters, scrubbers or regenerative thermal oxidisers. As a result the present invention has the advantage that problems associated with odours are much reduced.

It is possible to utilise the present invention to deal with peak or high sludge throughputs only. In this instance, sludge would be treated according to a chosen method on days in which approximately average or below average amounts of sludge require treatment. One such method is to pre-dry the sludge to substantially the desired dry solids content of the product before treating the dried sludge with alkaline admixture: this method is the subject of co-pending applications by the present Applicant. When sludge demand exceeds the average by any chosen degree, a splitter can be used to separate the sludge into streams which are treated according to the present invention, e.g., one stream is dried whilst the other stream is a "wet" stream, the two streams subsequently being mixed, and then pasteurised and stabilized. In this way, a facility can cope with peak sludge demands by using the method of the present invention.

Due to the reduction in costs associated with the present invention, and the fact that the present invention provides useful, consistent and saleable products (i.e., high quality dried sludge products and surplus electricity), it is believed that a facility according to the present invention can provide a return on capital investment within 4 to 5 years of operation.

What is claimed is:

1. A process for treating sewage or similar organic sludge to produce a pasteurised and dried product comprising the steps of:
    dividing the sludge into at least one first portion and at least one second portion;
    drying the first portion so that the first portion has a higher dry solids content than that of the second portion;
    mixing the first portion and the second portion to produce a mixture having a dry solids content which is intermediate between that of the first and second portions;
    adding an alkaline admixture to the mixture in order to pasteurise the mixture and thereby produce the product without employing subsequent drying by aeration.

2. A process according to claim 1 in which the alkaline admixture is added to the mixture in order to stabilise the mixture.

3. A process according to claim 1 further comprising the step of dewatering the sludge to produce dewatered sludge cake prior to dividing the sludge into at least one first portion and second portion.

4. A process according to claim 1 in which the step of drying the first portion effects substantial pasteurisation of the first portion.

5. A process according to claim 4 in which the step of drying the first portion effects complete pasteurisation of the first portion.

6. A process according to claim 1 in which the first portion is dried to a dry solids content of greater than 55%.

7. A process according to claim 1 in which the first portion is dried to a dry solids content of less than 90%.

8. A process according to claim 1 in which the dry solids content of the mixture is 50% or greater.

9. A process according to claim 1 in which the dry solids content of the product is greater than 60%.

10. A process according to claim 1 in which the product is continuously discharged.

11. A process according to claim 10 in which the pasteurisation and drying of the mixture is performed in a first in first out hopper.

12. A process according to claim 1 in which the drying of the first portion is performed utilising waste heat.

13. A process according to claim 12 in which the drying of the first portion is performed utilising heat generated by an electrical generator.

14. A process according to claim 13 in which the electrical generator utilises methane gas evolved from a landfill or digester site.

15. A process according to claim 1 in which the alkaline admixture is added to the mixture at a mixing ratio less than or equal to 30% by weight of sludge dry solids.

16. A process according to claim 1 in which the alkaline admixture comprises lime.

17. A process according to claim 16 in which the lime is pulverised or otherwise finely granularised.

18. A process according to claim 1 in which drying of the sludge is effected by a thin film dryer.

19. A process according to claim 18 in which the drying is effected by a horizontal single pass, indirectly heated thin film dryer.

20. A continuous method according to claim 1.

21. A facility for treating sewage sludge or similar organic sludge in a process according to claim 1, comprising:

means for dividing the sludge into at least one first portion and at least one second portion;

means for drying the first portion so that the first portion has a higher dry solids content than that of the second portion;

means for mixing the first portion and the second portion to produce a mixture having a dry solids content which is intermediate between that of the first and second portions;

means for adding an alkaline admixture to the mixture;

means for retaining the mixture and the added alkaline admixture in order to pasteurise the mixture, optionally to commence stabilisation, and thereby produce the product without employing subsequent drying by aeration.

22. A facility according to claim 21 in which the means for retaining the mixture and the added alkaline admixture comprises a first in first out hopper.

23. A facility according to claim 21 further comprising means for dewatering the sludge prior to the division of the sludge into at least one first portion and second portion.

24. A facility according to claim 21 in which the means for drying the first portion comprises an electrical generator and means for transferring heat generated by the electrical generator to the first portion.

25. A facility according to claim 21 in which the means for dying the first portion comprises a thin film dryer.

26. A facility according to claim 25 in which the dryer is a horizontal, single pass, indirectly heated thin film dryer.

27. A facility according to claim 21 further comprising at least one store containing lime, the lime being used as the alkaline admixture or as part of the admixture.

* * * * *